(12) United States Patent
Michels et al.

(10) Patent No.: US 9,994,130 B2
(45) Date of Patent: Jun. 12, 2018

(54) TRANSFER SEAT WITH LOCKING MECHANISM

(71) Applicant: B & D Independence, LLC, Winamac, IN (US)

(72) Inventors: Larry Dean Michels, Olney, IL (US); Jonathan D. Decker, Mount Carmel, IL (US); John A. Evans, Mount Carmel, IL (US)

(*) Notice: Subject to any disclaimer, the term of this patent is extended or adjusted under 35 U.S.C. 154(b) by 0 days. days.

(21) Appl. No.: 15/034,362

(22) PCT Filed: Nov. 4, 2014

(86) PCT No.: PCT/US2014/063835
§ 371 (c)(1),
(2) Date: May 4, 2016

(87) PCT Pub. No.: WO2015/066683
PCT Pub. Date: May 7, 2015

(65) Prior Publication Data
US 2016/0264024 A1   Sep. 15, 2016

Related U.S. Application Data

(60) Provisional application No. 61/899,873, filed on Nov. 4, 2013.

(51) Int. Cl.
*B60N 2/07* (2006.01)
*B60N 2/24* (2006.01)
(Continued)

(52) U.S. Cl.
CPC .......... *B60N 2/245* (2013.01); *B60N 2/0232* (2013.01); *B60N 2/062* (2013.01); *B60N 2/067* (2013.01);
(Continued)

(58) Field of Classification Search
CPC ...... B60N 2/0715; B60N 2/06; B60N 2/0705; B60N 2/08; B60N 2/12; B60N 2/0818;
(Continued)

(56) References Cited

U.S. PATENT DOCUMENTS 2,930,428 A * 3/1960 De Rose .............. B60N 2/0232 248/394
4,225,177 A * 9/1980 Kluting ................ B60N 2/0232 188/69

(Continued)

OTHER PUBLICATIONS

International Search Report and Written Opinion dated Mar. 3, 2015, Application No. PCT/US2014/063835, 7 pages.

*Primary Examiner* — Nkeisha Smith
(74) *Attorney, Agent, or Firm* — Gutwein Law; Tyler B. Droste (57) ABSTRACT

A transfer seat base for a vehicle, including a rail frame having rails; a carriage frame positioned to ride along the rails and configured for receipt of a seat mounted thereto; a powered motive mechanism for, upon actuation, longitudinally moving the carriage frame along the rails between a forward driving position and a rearward occupant transfer position; a locking mechanism operable upon cessation of actuation of the motive mechanism to automatically lock the carriage frame against longitudinal movement at various positions between the forward driving position and rearward occupant transfer position.

10 Claims, 10 Drawing Sheets

(51) Int. Cl.
  *B60N 2/14* (2006.01)
  *B60N 2/02* (2006.01)
  *B60N 2/06* (2006.01)
  *B60N 2/08* (2006.01)

(52) U.S. Cl.
  CPC ............. *B60N 2/07* (2013.01); *B60N 2/0722* (2013.01); *B60N 2/08* (2013.01); *B60N 2/0825* (2013.01); *B60N 2/0875* (2013.01); *B60N 2/14* (2013.01); *B60N 2002/0236* (2013.01)

(58) Field of Classification Search
  CPC ........ B60N 2/085; B60N 2/07; B60N 2/0722; B60N 2/0825
  USPC .............. 248/424, 425, 429, 430; 297/65.13, 297/65.15, 344.11
  See application file for complete search history.

(56) References Cited

U.S. PATENT DOCUMENTS

| | | | | |
|---|---|---|---|---|
| 4,364,536 A * | 12/1982 | Kluting | ................ | B60N 2/0232 248/393 |
| 4,747,465 A * | 5/1988 | Hodgson | ............... | B60R 25/006 180/287 |
| 4,846,529 A * | 7/1989 | Tulley | .................. | B60N 2/0232 297/330 |
| 5,213,388 A * | 5/1993 | Baker | .................. | B60N 2/0717 180/287 |
| 5,323,998 A * | 6/1994 | Aihara | ................. | B60N 2/067 248/188.9 |
| 6,572,172 B1* | 6/2003 | Ninomiya | ............ | B60N 2/0232 296/65.07 |
| 6,612,647 B1* | 9/2003 | Munch | ................... | B60N 2/071 297/216.1 |
| 6,948,693 B2* | 9/2005 | Goodbred | .............. | B60N 2/067 248/424 |
| 7,604,213 B2* | 10/2009 | Choi | .................... | B60N 2/0232 248/419 |
| 8,573,847 B2* | 11/2013 | Lee | ........................ | F16C 29/041 384/47 |
| 9,016,797 B2* | 4/2015 | Iida | ....................... | B60N 2/0252 280/250.1 |
| 2001/0038223 A1* | 11/2001 | Suga | ...................... | B60N 2/062 296/65.11 |
| 2008/0224522 A1* | 9/2008 | Taguchi | ................... | B60N 2/06 297/344.21 |
| 2013/0320179 A1* | 12/2013 | Beneker | ............... | B60N 2/0232 248/429 |
| 2016/0114703 A1* | 4/2016 | Fujita | ................... | B60N 2/0232 297/344.1 |

* cited by examiner

TRANSFER SEAT WITH LOCKING MECHANISM

FIELD OF THE INVENTION

This invention relates to vehicle seats adapted for use with mobility devices, and more particularly, to vehicle transfer seats having a variably positioning locking system.

BACKGROUND OF THE INVENTION

Persons with physical disabilities are often enabled to drive by converting a van or similar vehicle to accommodate the particular mobility device (wheelchair) being used. For example, some systems enable the wheelchair to maneuver right up to a driving position behind the steering wheel and there be securely locked in place, the driver then operating the vehicle still seated in his wheelchair. In other cases, the vehicle's OEM seat is remounted atop a seat transfer base. The driver maneuvers his wheelchair up close to the seat and seat transfer base combination and, using controls on the seat transfer base, moves the seat to a desired position next to his wheelchair so that he can then most effectively slide himself from the wheelchair seat to the vehicle seat. The same seat transfer base controls are then used to move the vehicle seat back to its home position, facing forward and proximal to the steering wheel. While the OEM seat is most often adjustable along several axes to suit the size and comfort of the driver, seat transfer bases are typically not adjustable. What is desired is an adjustment and locking mechanism for a vehicle seat transfer base.

SUMMARY OF THE INVENTION

A transfer seat base for a vehicle, including a rail frame having rails; a carriage frame positioned to ride along the rails and configured for receipt of a seat mounted thereto; a powered motive mechanism for, upon actuation, longitudinally moving the carriage frame along the rails between a forward driving position and a rearward occupant transfer position; a locking mechanism operable upon cessation of actuation of the motive mechanism to automatically lock the carriage frame against longitudinal movement at various positions between the forward driving position and rearward occupant transfer position.

It is an object of the present invention to provide an improved seat transfer base for a handicapped accessible vehicle.

Other objects and advantages will become apparent from the following description of the preferred embodiment.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations or modifications in the illustrated device, and any further applications of the principles of the invention as illustrated therein are contemplated as would normally occur to one skilled in the art to which the invention relates.

Figure 1:
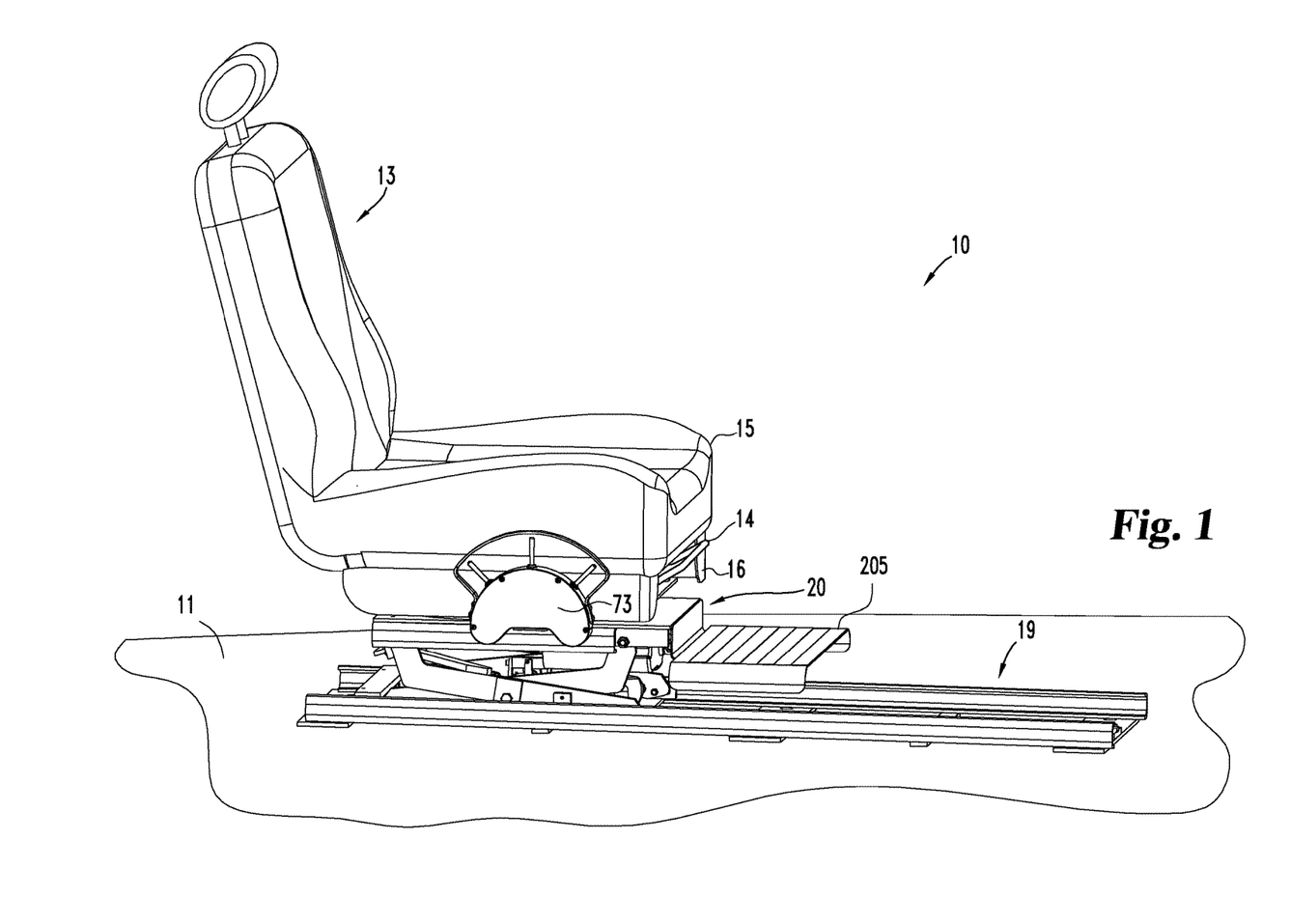
FIG. 1 is a right side perspective view of a transfer seat base 10 in accordance with one embodiment of the present invention and with a vehicle seat 13 mounted thereon.

Referring to FIG. 1, there is shown a transfer seat base 10 in accordance with the present invention. Transfer seat base 10 is configured for mounting to the floor 11 of a handicapped accessible vehicle and for receipt of an OEM or other seat 13 mounted to the top thereof. It is customary that such OEM seat 13 be provided with some degree of positional adjustability, typically at least along a longitudinal (front to back) axis relative to the vehicle, and that it include a locking mechanism (not shown) to releasably lock the seat 13 in the desired longitudinal position. For seat 13, the OEM locking mechanism is momentarily releasable by pulling a locking handle 14 located between the seat's lower cushion 15 and its base 16.

Referring to FIGS. 1-5, transfer seat base 10 generally includes a rail frame 19, a carriage frame 20, a motive mechanism 21 and a transfer seat base locking mechanism 22. Rail frame 19 includes left and right, C-cross-sectioned rails 24 and 25, respectively, and a plurality of cross members 26, which include forward and rearward cross members 27 and 28, respectively, all of which rigidly connect rails 24 and 25 together in a mutually parallel and mirror image position, as shown. Rail frame 19 is rigidly affixed to the vehicle floor 11 by any appropriate means, such as bolts (not shown) through holes 29 defined in cross members 26.

Figure 2:
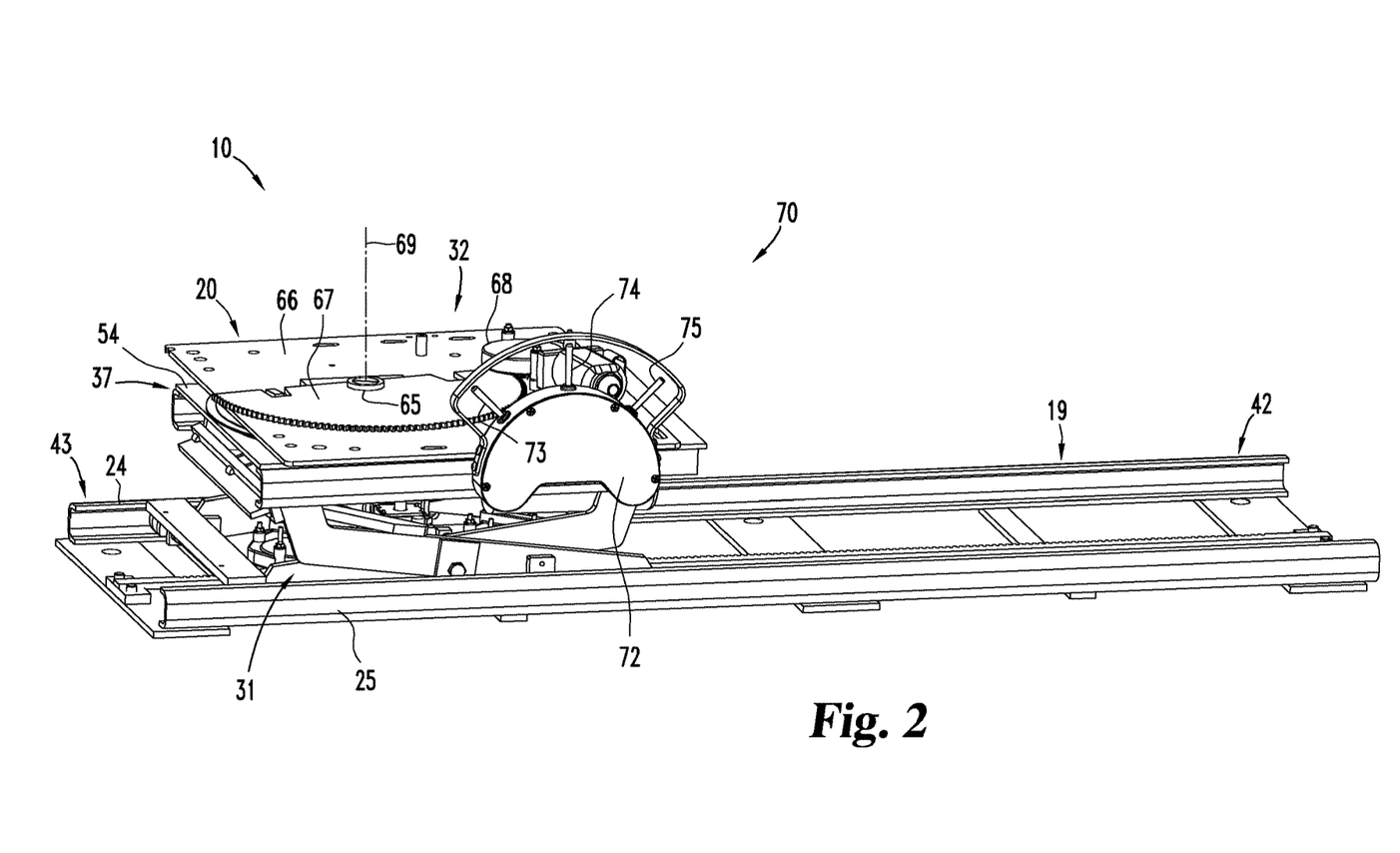
FIG. 2 is a right side and slightly rear perspective view of the transfer seat base 10 of FIG. 1.
Figure 3:
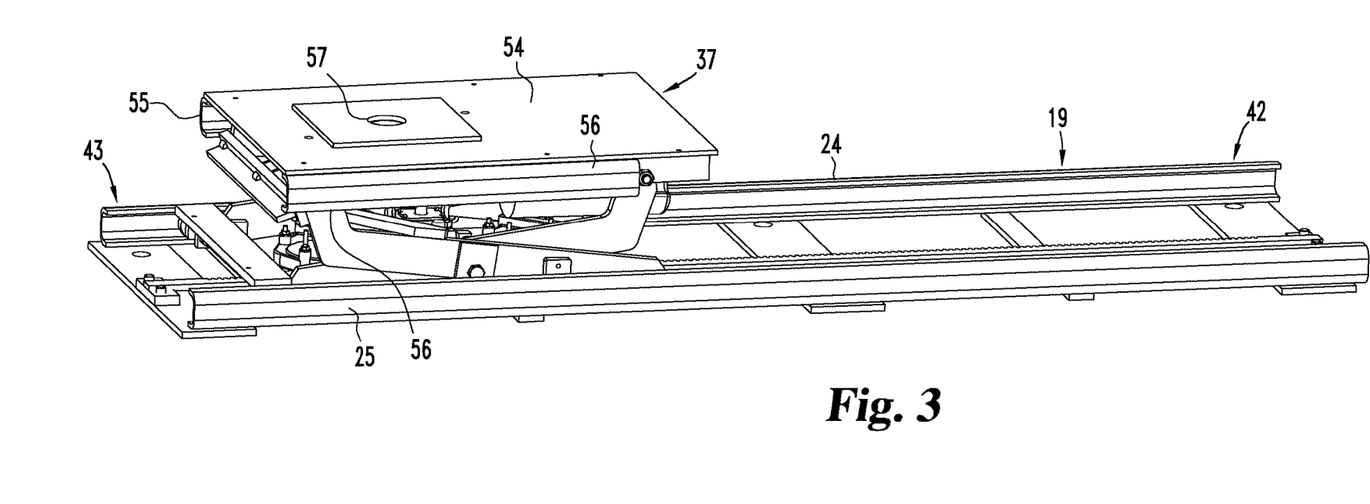
FIG. 3 is a right side and slightly rear perspective view of the transfer seat base 10 of FIG. 2 and with switch assembly 72, top plate 66 and rotation assembly 32 removed.
Figure 4:
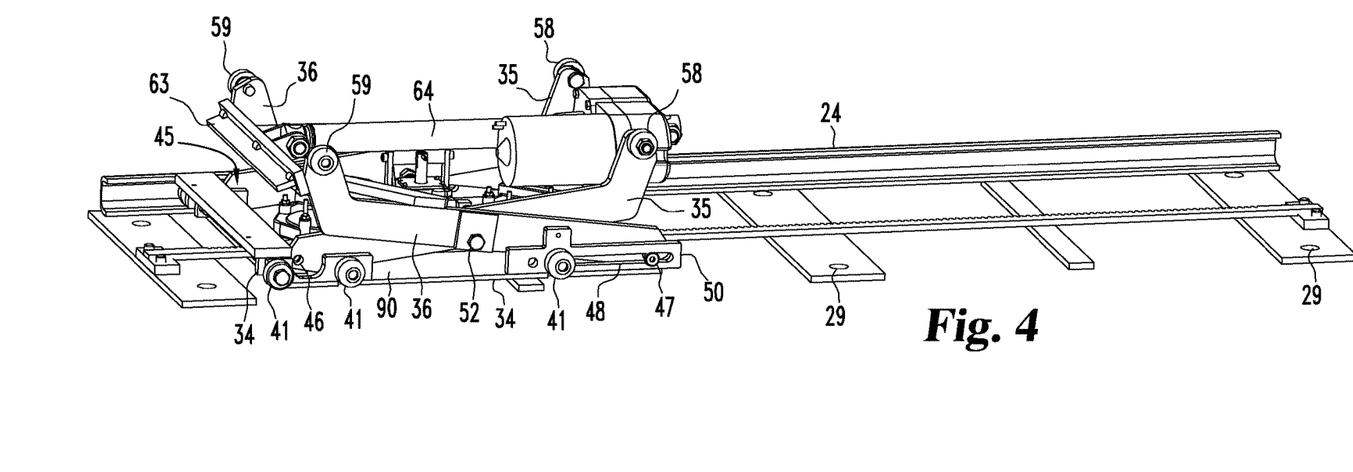
FIG. 4 is a right side and slightly rear perspective view of the transfer seat base 10 of FIG. 3 and with top plate assembly 37 removed.

Referring to FIGS. 2-5, carriage frame 20 includes a lift assembly 31 and a rotation assembly 32. Lift assembly 31 is a scissor-type lift assembly and includes a base frame 34, opposing pairs of inner and outer scissor arms 35 and 36, an upper plate assembly 37 and an actuator assembly 38. Referring to FIGS. 3 and 4, base frame 34 includes a plurality of rollers 41 that ride within the opposing, C-cross-sectioned rails 24 and 25 and enable base frame 34 to move between the front and rear ends 42 and 43, respectively, of rail frame 19. Opposing inner scissor arms 35 are rotatably connected at their lower, rear ends at 45 and 46 to the rear of base frame 34, and opposing outer scissor arms 36 have follower rollers (only the right roller 47 shown, FIG. 4) at their lower, front ends, which rollers are constrained to follow within longitudinal slots (one shown at 48) defined in upstanding walls 49 and 50 of base frame 34, as shown. Generally midway between their upper and lower ends, the left and right inner scissor arms 35 and corresponding left and right outer scissor arms 36 are rotatably mounted together (at 51 and 52, respectively) to pivot in scissor fashion, as is well known for such scissor lift assemblies.

Upper plate assembly 37 includes an upper plate 54 with a reinforced hole (at 57) and left and right, C-cross-sectioned rails 55 and 56 rigidly connected to its outer edges, as shown. Rollers 58 mounted to the upper, front ends of inner scissor arms 35 and rollers 59 mounted to the upper, rear ends of outer scissor arms 36 are positioned to ride within the opposing, C-cross-sectioned rails 55 and 56. Inner scissor arm bracing 62 extends between and rigidly connects the upper, front ends of inner scissor arms 35, and outer scissor arm bracing 63 extends between and rigidly connects the upper, rear ends of outer scissor arms 36. Actuator assembly 38 includes any appropriate linear motion drive unit, such as a linear or screw driven actuator 64, which is mounted between the inner and outer scissor arm bracings 62 and 63. Retraction and extension of the actuator 64 moves inner and outer scissor arm bracings 62 and 63, and thus the upper ends of inner scissor arms 35 toward and away from the upper ends of outer scissor arms 36 which, because the lower, rear ends of inner scissor arms 35 are pivotally mounted to base frame 34, causes the upper ends of scissor arms 35 and 36, and the upper plate 54 rollably connected therewith, to rise and fall, respectively, relative to base frame 34.

Referring to FIGS. 2 and 3, rotation assembly 32 includes a top plate 66, a hemi-circular gear plate 67 and a drive motor 68. Top plate 66 is mounted via a bearing sleeve (not shown) to upper plate 54 for rotation about an axis 69 that is coaxial with that of hole 57. Gear plate 67 includes a radially central post (the top of which is visible at 65) that is rigidly connected with gear plate 67 and extends down through the bearing sleeve (not shown) of top plate 66, where it is rigidly connected to upper plate 54 at hole 57. Drive motor 68 has a pinion (not shown) and is mounted atop top plate 66 so that its pinion engages with gear plate 67. Since gear plate 67 is fixed to upper plate 54, actuation of drive motor 68 thus causes it (gear motor 68) and its top plate 66 to rotate about axis 69 from a forward, home position 70 to a transfer position (not shown) rotated 90 degrees clockwise therefrom.

A switch assembly 72 is mounted to top plate 66 so that it rotates with top plate 66 (and thus with the seat 13 mounted thereto). Switch assembly 72 provides user actuation switches 73, 74 and 75, which operate drive motor 68, linear actuator 64, and the drive motors 85 and 86 of transfer seat mechanism 10, respectively, as described below. Wiring, power supplies, fasteners and other ancillary components of the invention are naturally contemplated and included in the invention, but are sufficiently well known in the art that they are not otherwise needed to be shown or discussed. With seat 13 mounted atop top plate 66, actuation of the appropriate switch of switch assembly 72 will move seat 13 up and down and will rotate seat 13 between the forward (facing), home position 70 and the rotated-to-the right, transfer position (not shown). Seat 13 is shown in FIG. 1 in a down position and in the forward (facing), home position.

Figure 5:
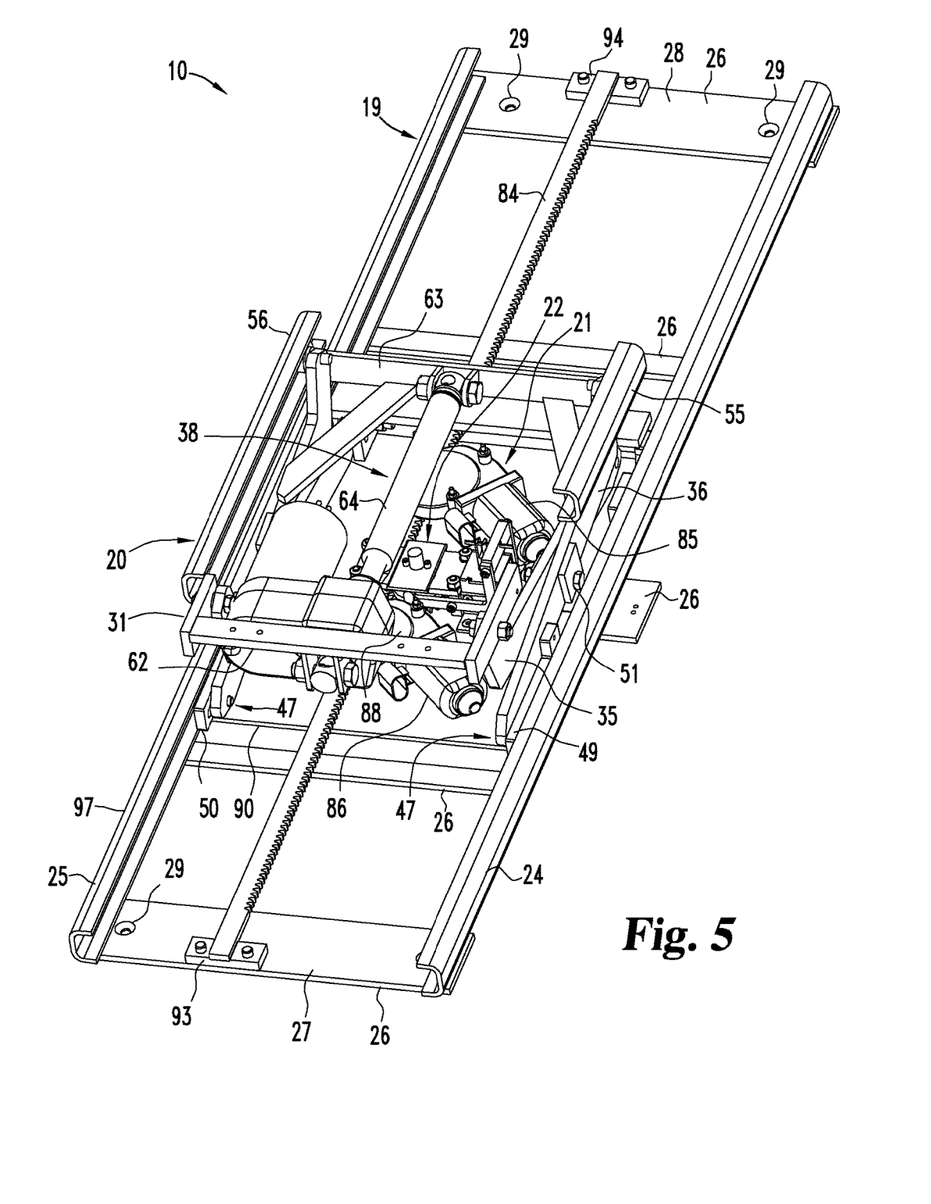
FIG. 5 is a left side and front perspective view of the transfer seat base 10 of FIG. 4.
Figure 6:
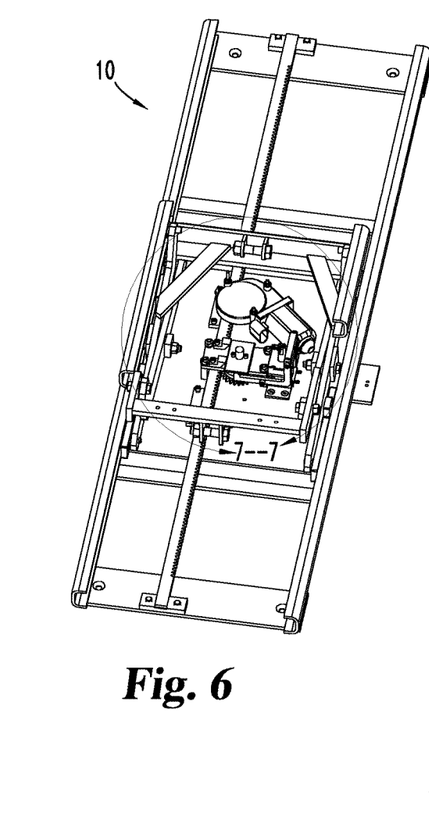
FIG. 6 is a left side and front perspective view of the transfer seat base 10 of FIG. 5, showing the location of detail enlargement for FIG. 7, and with drive motor 88 removed.
Figure 7:
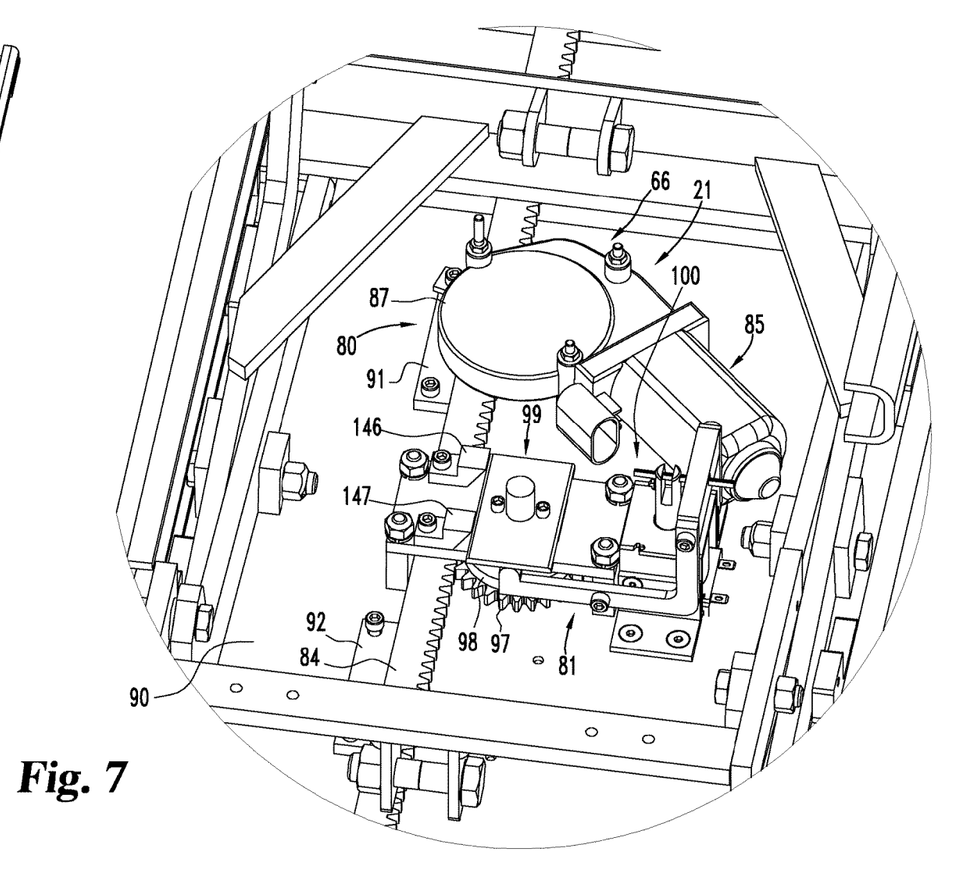
FIG. 7 is an enlarged view of a portion of the transfer seat base 10 of FIG. 6 and taken with the detail circle 7-7.
Figures 10, 11:
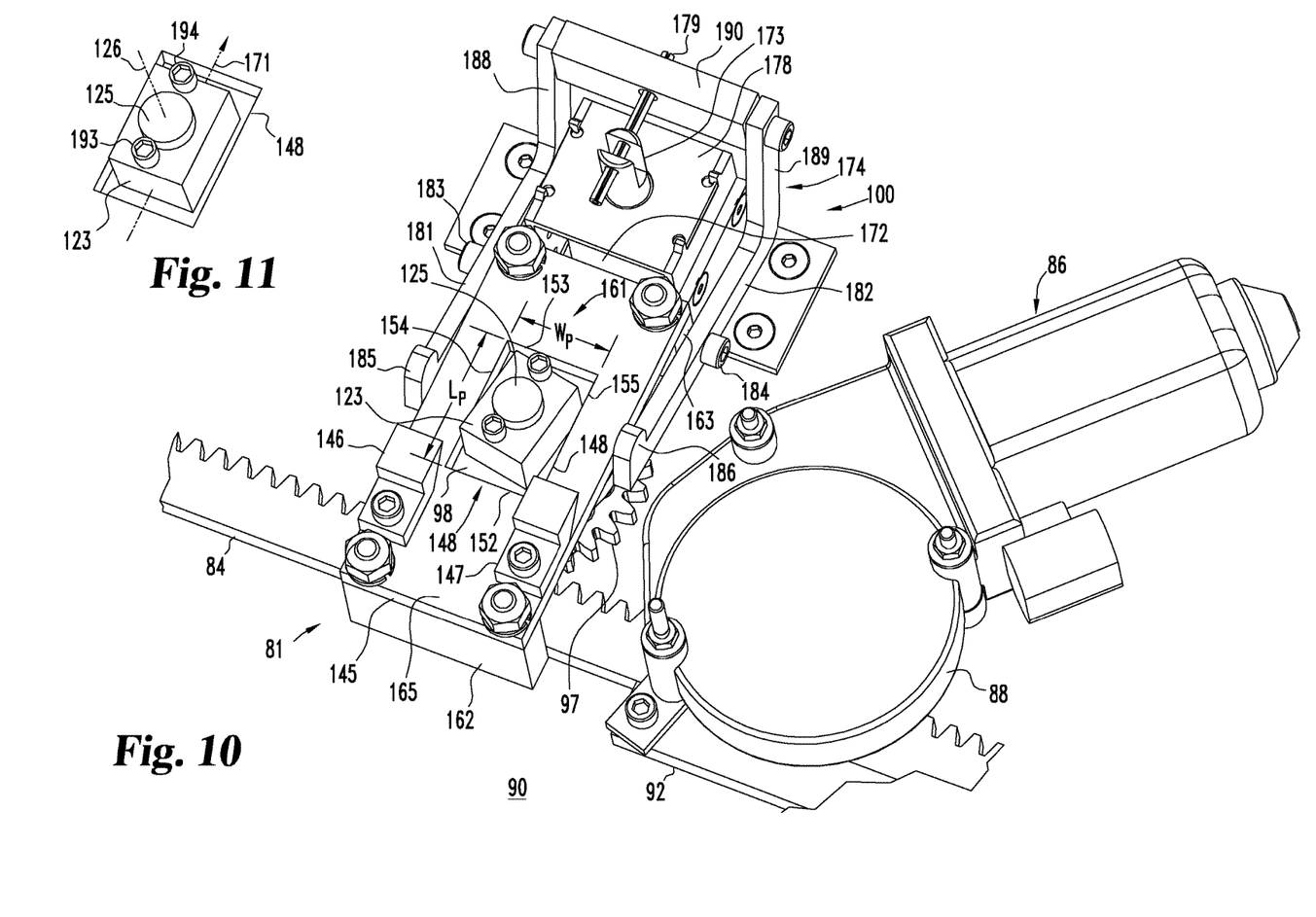
FIG. 10 is an enlarged, right side and front perspective view of a portion of the variable locking assembly 81 of the transfer seat base 10 of FIG. 5.
FIG. 11 is a perspective view of the upper block 123 rotated to the centered position 171 within alignment hole 148.
Figures 12, 13, 14, 15:
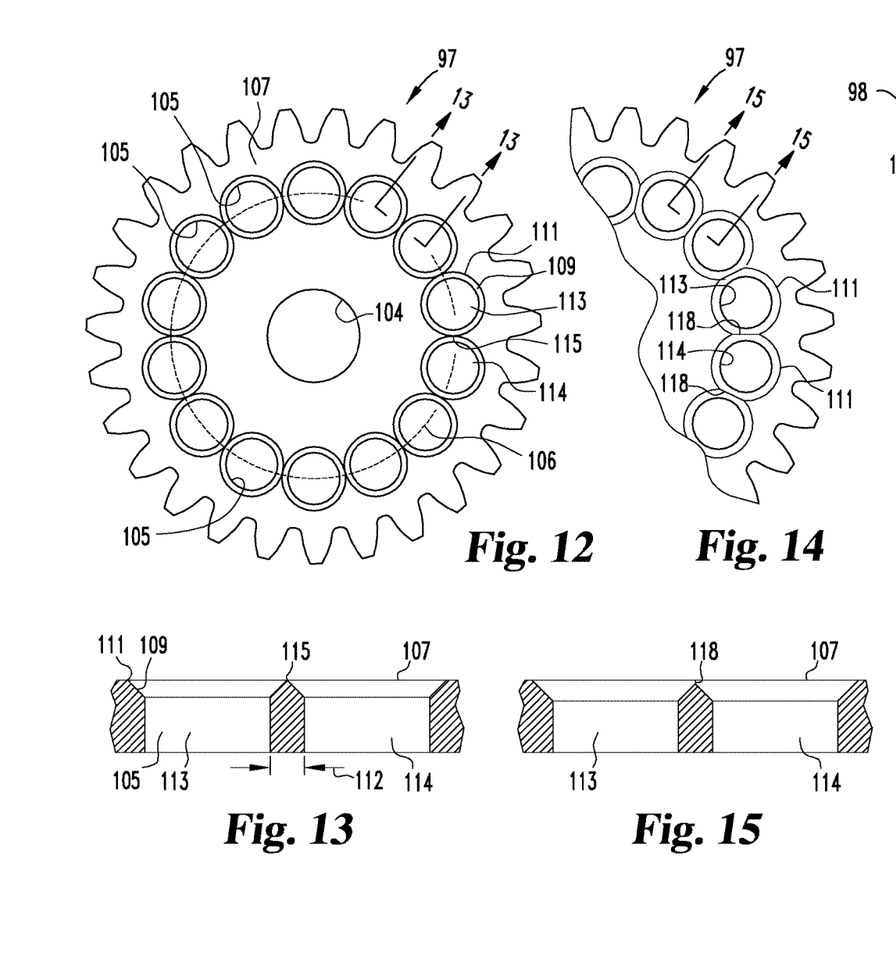
FIG. 12 is a plan view of the locking pinion 97 of the variable locking assembly 81 of the transfer seat base 10 of FIG. 9.
FIG. 13 is a side, cross-sectional view of the locking pinion 97 of FIG. 12 taken along the lines 13-13 and viewed in the direction of the arrows.
FIG. 14 is a plan view of the locking pinion 97 of FIG. 12 in accordance with another embodiment of the present invention.
FIG. 15 is a side, cross-sectional view of the locking pinion 97 of FIG. 12 taken along the lines 15-15 and viewed in the direction of the arrows.
Figure 16:
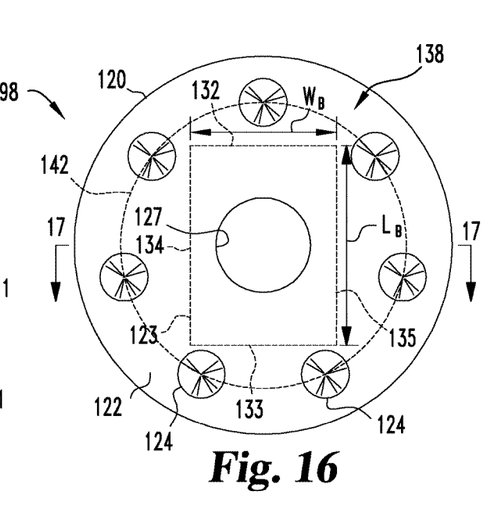
FIG. 16 is a bottom view of the lock plate assembly 98 of the transfer seat base 10 of FIG. 9.

Referring to FIGS. 5, 7 and 10, motive mechanism 21 comprises a rack and pinion drive assembly 80, which includes a rack 84 and, here, two drive motors 85 and 86, each with a drive pinion (not shown, but located inside of the drive motor housings 87 and 88 of the drive motors 85 and 86, respectively, and positioned to engage with rack 84). Drive motors 85 and 86 are mounted to the base plate 90 of carriage frame 20, one on each side of variable locking assembly 81. Guide bars 91 and 92, also mounted to base plate 90, hold rack 84 in meshing engagement with the pinions inside of guide motors 85 and 86, and rack 84 is fixedly mounted at its opposing ends to the forward and rearward cross members 27 and 28 of rail frame 19, respectively, via rack mounting brackets 93 and 94. Actuation of drive motors 85 and 86, which are connected to the carriage frame base plate 90, thus moves carriage frame 20 and all connected with it (including seat 13) longitudinally along rack 84 between a forward driving position and a rearward occupant transfer position. Referring to FIGS. 7 and 10, transfer seat base locking mechanism 22 is a variable locking assembly 81 that includes a locking pinion 97, a lock plate assembly 98, a centering assembly 99 and a lock actuator assembly 100. Referring to FIGS. 7-13, locking pinion 97 is a pinion gear configured to mesh with rack 84 and defining a central hole 104 and a plurality of identically sized locking holes 105, the centers of which all lie on a common circle 106. In the present embodiment, there are 14 holes 105, but locking pinion 97 may be configured with more or fewer holes 105, as desired. At its top, each hole 105 is chamfered at about a 45 degree angle a short distance (e.g. about 1.0 mm) down from the top surface 107 of locking pinion 97. Each resulting chamfered surface 109 intersects the top surface 107 of locking pinion 97 to form a chamfer circle 111. Locking holes 105 are spaced apart a sufficient distance 112 to maintain the strength and integrity of locking pinion 97 under the loads and stresses to which it is to be subjected, and are positioned close enough together so that the chamfer circles 111 of each pair of adjacent holes (e.g. 113 and 114) are substantially in tangential abutment at a junction 115 (which is generally a point). Alternative embodiments are contemplated wherein each pair of adjacent holes (e.g. 113 and 114) is slightly closer to one another and/or its chamfers are slightly deeper (FIGS. 14 and 15) and/or there is some other alternative configuration so that their chamfer circles 111 slightly overlap, whereupon their mutual intersection is slightly below the locking pinion top surface 107 and forms a short junction line 118 (as opposed to a point).

Figures 8, 9:
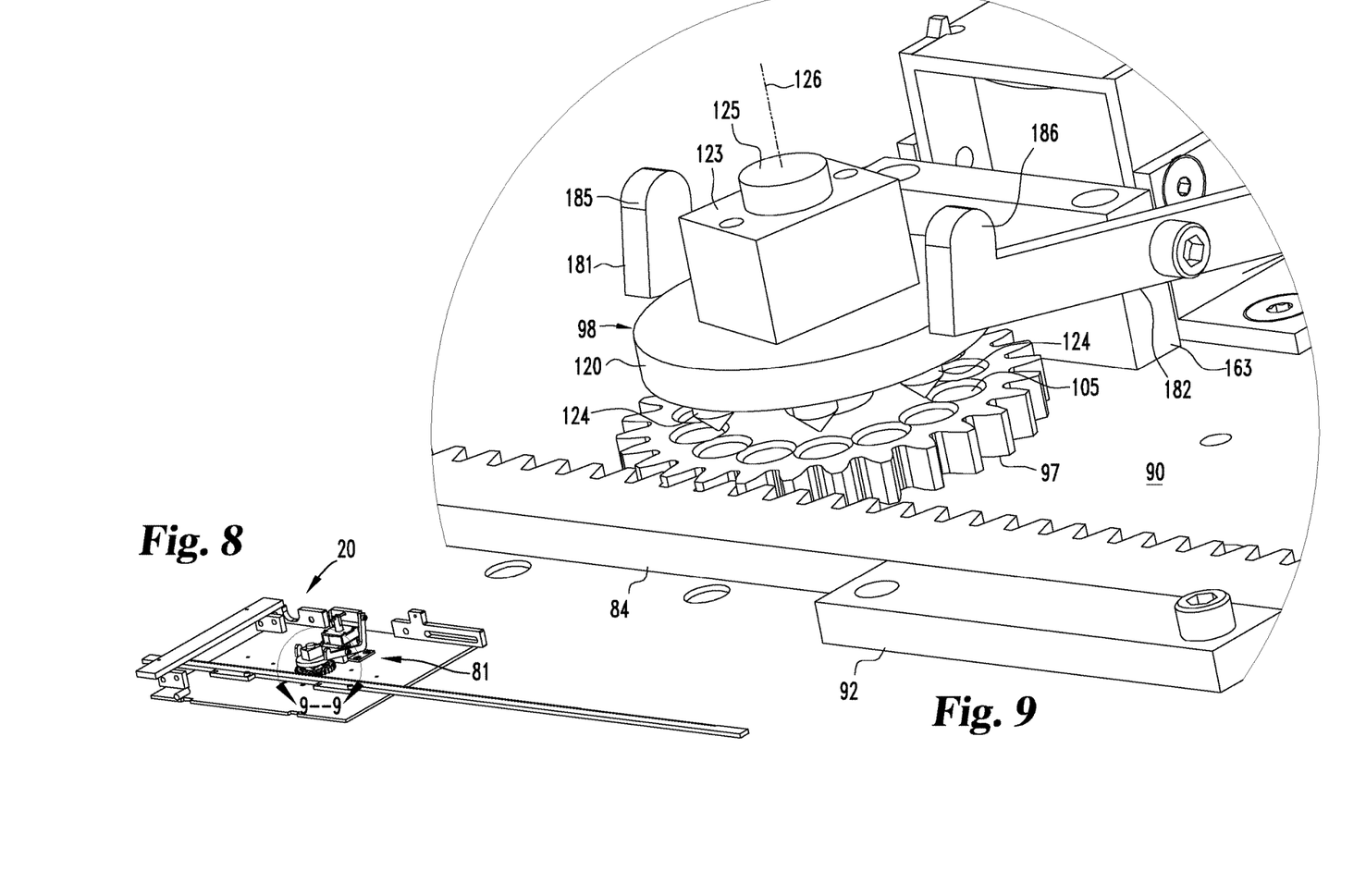
FIG. 8 is a right side and front perspective view of a portion of the carriage frame 20 and variable locking assembly 81 of the transfer seat base 10 of FIG. 5.
FIG. 9 is an enlarged view of the carriage frame 20 and variable locking assembly 81 of FIG. 8 and taken with the detail circle 9-9 and showing the rocker arms 181 and 182 in the unlocked position.

Referring to FIGS. 7-10, 16 and 17, lock plate assembly 98 includes a round locking plate 120 with top and bottom surfaces 121 and 122, respectively, an upper block 123 centered and fixedly mounted to the top surface 121, and a post 125 having an axis 126 and being fixed to and extending upwardly from base plate 90. Plate 120 includes a plurality of locking pins 124 extending downwardly from the bottom surface 122. Plate 120 and upper block 123 (FIG. 17) define central holes 127 and 128, respectively, that have a common axis 129 and that are of the same diameter as the hole 104 of locking pinion 97. Block 123 has a generally rectangular cross-section and has opposing connector sides 132 and 133 that have a width ($W_B$) and opposing contact sides 134 and 135 that have a length ($L_B$), the width ($W_B$) and length ($L_B$) lying in a plane essentially parallel to top surface 121. Together the width ($W_B$) and length ($L_B$) form a block tolerance dimension 138 comprising $W_B \times L_B$. Locking pins 124 are each tapered at their bottom ends to form a registry tip 140, the taper being at an angle of between about 40 and 50 degrees and generally being to a point 141. In the preferred embodiment, registry tip 140 is tapered at a 45 degree angle. There are seven locking pins 124, the axes of which are spaced out in a circle 142 that is coaxial with central hole 127 and that is sized so that, when locking plate assembly 98 is in coaxial alignment with and above locking pinion 97, one or both of locking pinion 97 and lock plate assembly 98 can be rotated about their axes 129 whereby the seven locking pins 124 are brought into alignment with any alternate series of holes 105 (that is, every other hole 105) of locking pinion 97 (as seen in FIG. 9).

Figure 17:
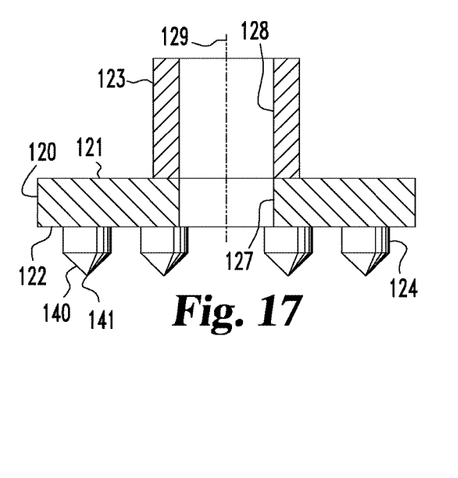
FIG. 17 is a side, cross-sectional view of the lock plate assembly 98 of FIG. 16 taken along the lines 17-17 and viewed in the direction of the arrows.

The holes 104, 127 and 128 of locking pinion 97, plate 120 and block 123 are all the same diameter and receive therethrough post 125 in a stack atop base plate 90 and with locking pinion 97 being in meshing engagement with rack 84. More specifically, in assembly, locking pinion 97 sits upon base plate 90 and over post 125. That is, post 125 extends through the hole 104 of locking pinion 97 and constrains locking pinion 97 in meshing engagement with rack 84, as shown. Also received over post 125 and above locking pinion 97 is the plate 120 and block 123 combination. Thus, post 125 extends through the central holes 127 and 128 of plate 120 and block 123 to constrain plate 120 and its locking pins 124 in alignment above the locking holes 105 of locking pinion 97.

Figures 18, 19:
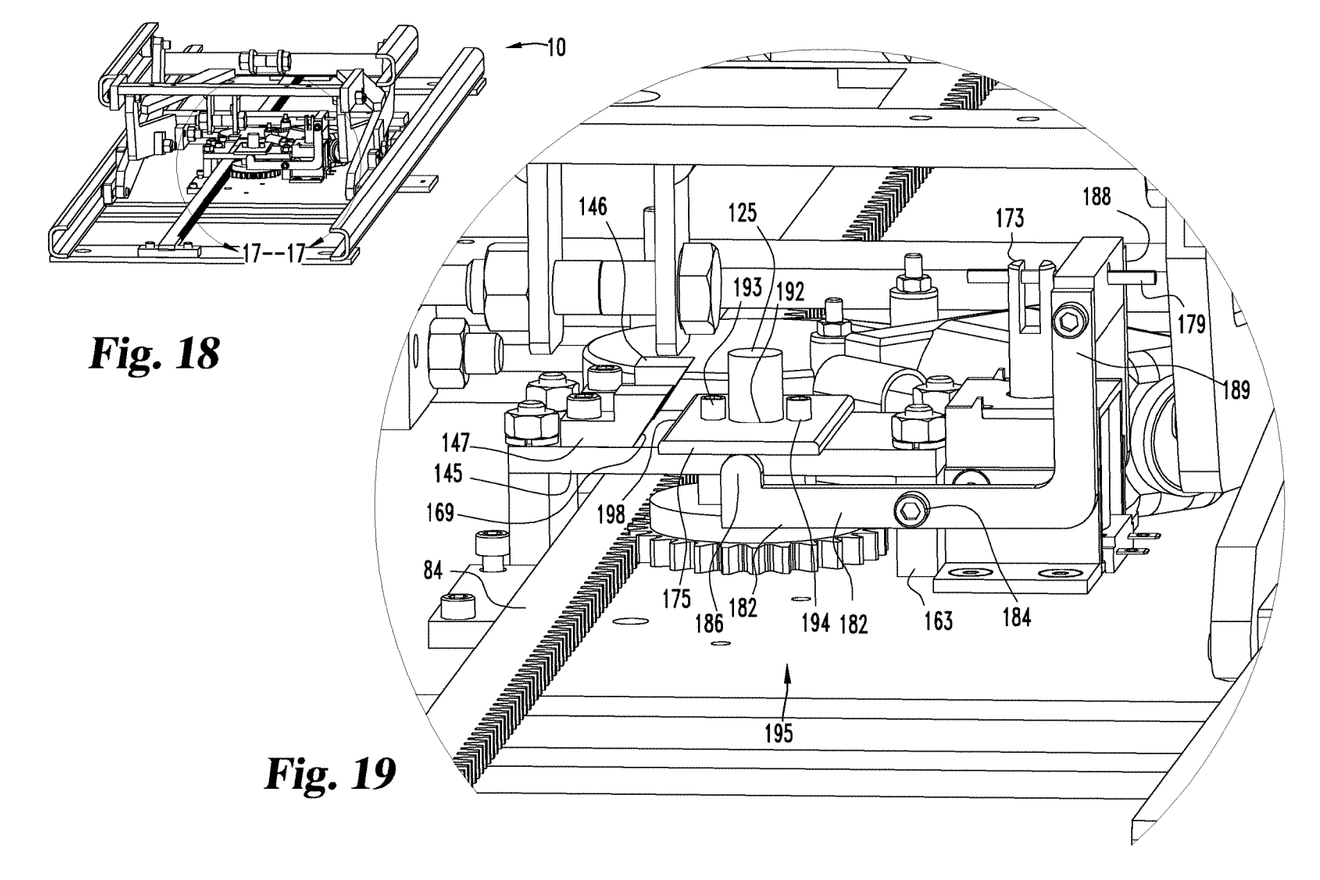
FIG. 18 is a left side and lower angled front perspective view of the transfer seat base 10 of FIG. 6, showing the location of detail enlargement for FIG. 19.
FIG. 19 is an enlarged view of a portion of the transfer seat base 10 of FIG. 18 and taken with the detail circle 19-19, and showing the lift arms in the down, locked position 195.

Referring to FIGS. 10 and 19, centering assembly 99 includes an alignment plate 145 and a pair of pre-alignment blocks 146 and 147. Alignment plate 145 defines a generally rectangular tolerance opening 148 having opposing connector sides 152 and 153 that have a width ($W_P$) and opposing contact sides 154 and 155 that have a length ($L_P$). Together the width ($W_P$) and length ($L_P$) form a tolerance opening dimension 161 comprising $W_P \times L_P$. Alignment plate 145 is fixedly connected to base plate 90 by right and left support blocks 162 and 163, which together support alignment plate 145 in a position above the plate 120 of lock plate assembly 98 and wherein upper block 123 extends up through and in central alignment within tolerance opening 148, as shown. In one embodiment, tolerance block dimension 138 ($W_B \times L_B$) is about 0.75 inches×1.0 inches, and the tolerance opening dimension 151 ($W_P \times L_P$) is about 1.0 inches×1.5 inches so that block 123 can rotate through an alignment angle of up to about 12.8° in either direction from its center position 171 (FIG. 11). The center position is where the opposing contact sides 134 and 135 are parallel with or at least form equal angles with or are equally distanced from the corresponding contact sides 154 and 155 of the tolerance opening 148, as described herein.

Pre-alignment blocks 146 and 147 are identical and are mounted on the top surface 165 of alignment plate 145 and to the side of tolerance opening 148. Alignment blocks 146 and 147 each define a contact surface 169 that is at an angle of about 55 degrees with the top surface 170 of alignment plate 145.

Lock actuator assembly 100 includes a lift solenoid 172 with output rod 173, a rocker arm assembly 174 and a lift plate 175. Lift solenoid 172 is held in a desired position atop base plate 90 by a solenoid housing 178 that is screwed to base plate 90, as shown. The output rod 173 extends upward out of solenoid 172 and through a hole in housing 178 and, at its top, includes a laterally extending push rod 179.

Rocker arm assembly 174 includes a pair of mirror-imaged, L-shaped rocker arms 181 and 182 that are pivotally mounted (at 183 and 184) to the opposing sides of left support block 163 and thus on opposing sides of alignment plate 145, as shown. Rocker arms 181 and 182 extend in one direction from their pivotal mountings at 183 and 184 to ends that form plate engagement humps 185 and 186. Rocker arms 181 and 182 extend in the opposite direction from their pivotal mountings 183 and 184 where they turn upwardly and terminate at ends 188 and 189, which are connected together by a bar 190. Bar 190 defines a hole through which extends push rod 179.

Lift plate 175 defines a hole 192 and rests atop alignment plate 145, over tolerance opening 148 and over upper block 123. It is there secured as by screws 193 and 194 to the top of upper block 123, with post 125 extending through hole 192. Lift plate 175 is sized to extend outwardly a distance from opposing sides of alignment plate 145 sufficiently to reside above and be engaged by plate engagement humps 185 and 186, as shown.

Figure 20:
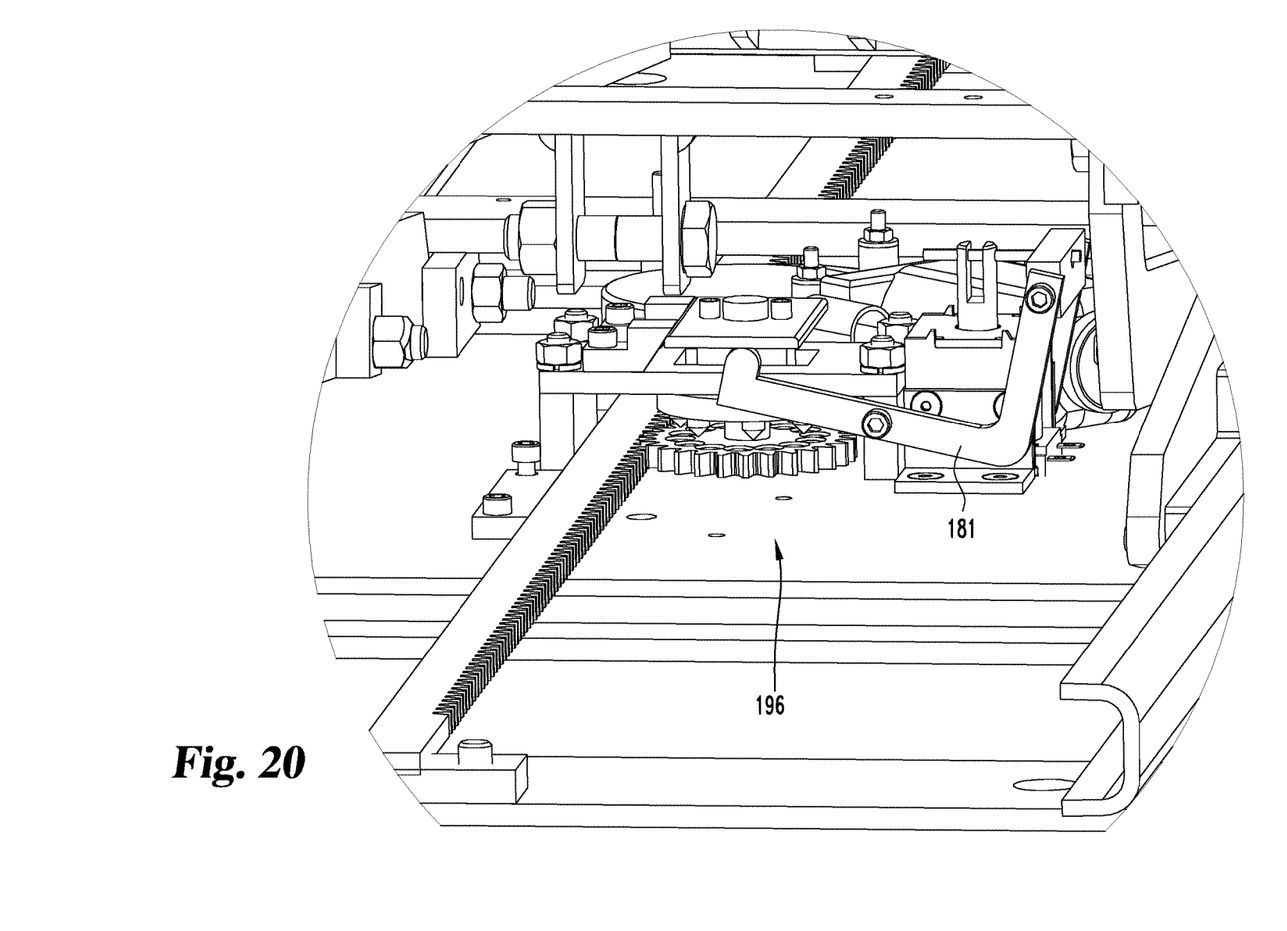
FIG. 20 is a view of the portion of the transfer seat base 10 of FIG. 19 and showing the lift arms in the up, unlocked position 196.

Variable locking assembly 81 includes a locked position 195 (FIG. 19) and an unlocked position 196 (FIG. 20). The sizes and configurations of the various components of variable locking assembly 81, including alignment plate 145, locking pinion 97, lock plate assembly 98 and its upper block 123, lift plate 175 and rocker arm assembly 174 are such that, in the locked position 195: lift solenoid 172 is inactivated and up; plate engagement humps 185 and 186 are in subjacent contact with the underside of opposing ends of lift plate 175; lift plate 175 is resting atop alignment plate 145; and round locking plate 120 of lock plate assembly 98 is resting atop locking pinion 97 with the seven locking pins 124 extending down into an alternate series of holes 105 (that is, every other of the 14 holes 105 is in receipt of one of the seven locking pins 124.

From the locked position, actuating switch 75 (of switch assembly 72), either forward or backward, actuates lift solenoid 172, which pulls down output rod 173 and its push rod 179, which pushes down bar 190 and the upper ends 188 and 189 of rocker arms 181 and 182, which pivots rocker arms 181 and 182 about their pivotal mountings 183 and 184, which raises humps 185 and 186 and the lift plate 175 in subjacent contact therewith. As lift plate 175 is raised, so is round locking plate 120 connected thereto, whereby its locking pins 124 rise out of and clear of the holes 105 of locking pinion 97, and locking pinion 97 is then free to rotate about post 125. With locking pinion 97 free to rotate, carriage frame 20 is now free to move, which occurs by the same actuation (either forward or backward) of the switch 75. That is, actuating switch 75 (1) activates variable locking assembly 81 to unlock and free locking pinion 97 for rotation and (2) activates drive motors 85 and 86 to move carriage frame 20 along rack 84.

Upon releasing switch 75, drive motors 85 and 86 cease operation, and carriage frame 20 stops moving along rack 84. Simultaneously or substantially simultaneously, activation of lift solenoid 172 stops, and variable locking assembly 81 (and its components) return to the locked position 195 (FIG. 19). When rocker arms 181 and 182 pivot back to the locked position 195, plate engagement humps 185 and 186 fall, and lift plate 175 drops back down to rest atop alignment plate 145. Consequently, round locking plate 120 falls, and its locking pins 124 descend into an alternating series of holes 105 in locking pinion 97. However, when carriage frame 20 stops moving, and locking pinion 97 thus stops rotating, the set of holes 105 will likely be out of direct subjacent alignment with the set of locking pins 124 thereabove. The misalignment will be up to about 12.9° in either direction. That is, rotation of locking pinion 97 by about 25.7° (360°/14 holes=25.71°) will move the holes 105 exactly one position to either side (that is, rotation of the locking pinion 97 of FIG. 12 about 25.71° in a clockwise direction about its axis would cause hole 113 to move into the position formerly occupied by hole 114). In the worst case scenario, if locking pinion 97 stops moving, and the point 141 of registry tip 140 is directly over the junction 115 (or the junction line 118) of two holes 105, the descent of round locking plate 120 will result in the points 141 of the seven locking pins 124 falling upon the junctions 115 (or 118) aligned therebelow, and the locking pins 124 will fail to fall into their holes 105, and lock plate assembly 98 will not engage with and lock locking pinion 97 from rotating.

As next described, the centering assembly 99 enables lock plate assembly 98 to engage with and lock locking pinion 97, and thus carriage frame 20 and the entire transfer seat base 10, from moving, regardless of the rotational misalignment presented between the locking pinion 97 and the lock plate assembly 98 when carriage frame 20 stops moving.

Because the tolerance opening dimension 161 is larger than the block tolerance dimension 138, block 123 and its round locking plate 120 and locking pins 124 are able to rotate about their central post 125. In the present embodiment, the tolerance opening dimension 161 ($W_P \times L_P$) is about 1.0 inches×1.5 inches, and the block tolerance dimension 138 ($W_B \times L_B$) is about 0.75 inches×1.0 inches. As a result, block 123 is able to rotate about post 125 within tolerance opening 148 a total of about 25.7°, or about 12.8° degrees in either direction from center position 171. This is the tolerance ratio angle.

When longitudinal movement of transfer seat base 10 is first activated by switch 75 and lift plate 175 is raised, the right side edge 198 of lift plate 175 contacts the sloping surface 169 of either of the two pre-alignment blocks 146 and 147 (depending on the direction in which block 123 is out of alignment) and, as lift plate 175 rises, its edge 198 rides along that sloping surface 169, which rotates lift plate 175 (and lock plate assembly 98 connected thereto) to the center position 171 (FIGS. 11 and 20). Then, when switch 75 is released, carriage frame 20 stops moving, solenoid 172 rises and lift plate 175 and its lock plate assembly 98 drop. Unless the locking pinion 97 happens to be perfectly aligned therebelow (unlikely), the points 141 and/or the tapered registry tips 140 will engage with the chamfered surfaces 109 and, by the force of its weight, lock plate assembly 98 will rotate up to the provided alignment angle of up to about 12.8°. (In the preferred embodiment, holes 105 and their chamfers are created so that the junction lines 118 of some length are created). The locking pins 124 will then be aligned over the corresponding holes 105, lock plate assembly 98 will drop into locking engagement with the locking pinion 97, and transfer seat base 10 will be in the locked position 195. The tolerance provided between block 123 and tolerance opening 148, when transfer seat base 10 is in the locked position 195, would enable carriage frame 20 to move longitudinally about 0.6 inches in this embodiment, but such movement would only occur in the event of a high force impact. That is, the drive motors 85 and 86 (when idle) restrain carriage frame 20 from moving longitudinally during normal operation of the vehicle, including during normal acceleration and braking actions. In the event of a high force impact, such as a crash, it is the variable locking assembly 81 that operates to hold carriage 20, seat 13 and the occupant therein stationary (except for the up to about 0.6 inches) along a longitudinal axis.

Alternative embodiments are contemplated wherein there are more or fewer holes 105, in which case the block tolerance dimension 138 and/or the tolerance opening dimension 161 and/or the block tolerance dimension 138 will vary to enable sufficient rotation of lock plate assembly 98 (that is, if there are 16 holes, 360°/16=a total alignment angle of about) 22.5°).

Pre-alignment blocks 146 and 147 can be mounted in a position other than as shown and can be configured alternately, so long as they function to engage with lift plate 175 as it is lifted and rotate lift plate 175 back to its centered position 171. In one embodiment, pre-alignment blocks 146 and 147 are made of Delrin or a similar low friction material to facilitate the centering action between blocks 146/147 and lift plate 175.

Alternative embodiments are contemplated wherein upper block 123 and/or tolerance opening 148 have shapes other than the rectangular shapes shown, so long as lock plate assembly 98 is similarly allowed by the block or similar structure to rotate about post axis 126 through the needed alignment angle to enable full engagement of locking pins 124 in holes 105.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. A transfer seat base for a vehicle, comprising:
   a rail frame having rails and a rack;
   a carriage frame positioned to ride along the rails and configured for receipt of a seat mounted thereto;
   a powered motive mechanism for, upon actuation, longitudinally moving said carriage frame along the rails between a forward driving position and a rearward occupant transfer position; and
   a locking mechanism operable upon cessation of actuation of said motive mechanism to automatically lock said carriage frame against longitudinal movement at various positions between the forward driving position and rearward occupant transfer position, wherein said locking mechanism comprises:
   a locking pinion rotatably mounted to said carriage frame and in engagement with the rack, said rail frame further including a lock plate assembly for selectively engaging with the locking pinion to prevent the pinion from rotating; and a lock actuator operable upon cessation of actuation of said motive mechanism to cause the lock plate assembly to lockingly engage with and prevent rotation of the locking pinion, wherein said lock actuator is operable upon actuation of said motive mechanism to cause said lock plate assembly to disengage with the locking pinion and permit rotation of the locking pinion and longitudinal movement of said carriage along the rails.

2. The transfer seat base for a vehicle of claim 1 wherein the locking pinion defines a plurality of locking holes and the lock plate assembly includes a locking plate having a plurality of locking pins and wherein locking engagement of the lock plate assembly with the locking pinion includes the locking pins being located in corresponding ones of the plurality of locking holes.

3. The transfer seat base for a vehicle of claim 2 wherein there are 15 of the plurality of locking holes and seven of the plurality of locking pins.

4. The transfer seat base for a vehicle of claim 3 wherein said locking mechanism further includes and a centering assembly for enabling the plate and its plurality of locking pins to rotate as needed to a position to enable the plurality of locking pins to readily enter the plurality of locking holes.

5. The transfer seat base for a vehicle of claim 4 wherein the lock actuator includes a lift plate with a side edge and the centering assembly includes at least one pre-alignment block with a sloped contact surface for engaging with the side edge and rotating the lift plate to a center position.

6. The transfer seat base for a vehicle of claim 5 wherein the centering assembly includes the lock plate assembly having a block that is rigidly connected to and to rotate with the locking plate and defines a block tolerance dimension and includes the lock actuator having a lift plate that defines a tolerance opening dimension that is larger than the block tolerance dimension and permits the block and locking plate to rotate through a tolerance ratio angle.

7. The transfer seat base for a vehicle of claim 6 wherein the tolerance ratio angle is 25.7°.

8. The transfer seat base for a vehicle of claim 6 wherein the block tolerance dimension is 0.75×1.0 inches and the tolerance opening dimension is 1.0×1.5 inches.

9. The transfer seat base for a vehicle of claim 1 wherein said carriage frame includes an upper plate for receipt of a seat connected thereto and includes a rotation assembly for selectively rotating the upper plate relative to the rail frame.

10. The transfer seat base for a vehicle of claim 1 wherein said carriage frame includes an upper plate for receipt of a seat connected thereto and includes a lift assembly for selectively raising and lowering the upper plate relative to the rail frame.

* * * * *